United States Patent Office 3,366,610
Patented Jan. 30, 1968

3,366,610
PERHALOGENATED EPOXY OLEFIN
MONOMERS AND POLYMERS
Burton C. Anderson, Wilmington, Del., assignor to E. I.
du Pont de Nemours and Company, Wilmington, Del.,
a corporation of Delaware
No Drawing. Filed May 14, 1965, Ser. No. 455,980
17 Claims. (Cl. 260—80.3)

The present invention relates to novel oxygen-containing fluorocarbon compounds, and more particularly, to novel ethylenically unsaturated fluorocarbon epoxides and to polymers prepared therefrom.

Because of their excellent chemical and thermal stabilities the fluorocarbon polymers are used for the fabrication of articles which are employed in a wide variety of applications where resistance against heat and chemical attack is essential. In some cases, however, the use of fluorocarbon polymers is limited by deficiencies in their physical properties for the in-use environmental conditions to which the fabricated article is exposed. Although variations in the physical properties of hydrocarbon polymers have been achieved by utilizing monomeric materials which contain at least two different kinds of polymerizable functional groups so as to provide a plurality of reactive sites from which a three-dimensional polymeric network can be fashioned, such an expedient is restricted in the fluorocarbon polymer field by the limited availability of monomers which contain at least two different types of functional groups which are available for participating in a polymerization reaction. For example, it heretofore has been impossible to prepare an ethylenically unsaturated perfluorinated epoxide since conventional preparative methods, such as monoepoxidation of a diene, are not available.

It is an object, therefore, of the present invention to provide novel ethylenically unsaturated fluorocarbon epoxides which are suitable as chemical intermediates and as polymerization monomers. Another object of this invention is to provide fluorocarbon monomers which contain two different types of functional groups which are reactive in polymerization reactions. Still another object of the present invention is to provide fluorocarbon polymers which contain the reactive sites essential for post-polymerization curing. Other objects will become apparent hereinafter.

The objects of the present invention are achieved by means of an ethylenically unsaturated fluorinated epoxide having the formula

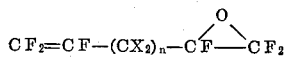

wherein X is selected from the group consisting of fluorine and chlorine atoms and $n$ is 0 to 10, with the provisos that at least 75 percent of the X halogens are fluorine, and when X is chlorine, the carbon atom to which it is attached is at least one carbon atom removed from the trifluorovinyl and epoxyethyl (trifluorooxirane) groups and another carbon atom containing chlorine.

The ethylenically unsaturated fluorinated epoxides of this invention are prepared by the epoxidation of a 1,2-dichloro-ω-ethylenically unsaturated fluorocarbon followed by dehalogenation. The 1,2-dichloro-ω-ethylenically unsaturated fluorocarbon may be prepared by either of two routes. One route involves the decarboxylation of the sodium salt of an ω-chlorodifluoro-(ω-1)-chlorofluoroperhalogenated saturated normal aliphatic monocarboxylic acid having 5 to 15 carbon atoms, with said acid being subject to the provisos that the halogens on the α-carbon atom are fluorine, the halogens on the β-carbon atom are comprised of at least one fluorine, and the halogens on the α to (ω-2) carbon atoms are comprised of at least 75 percent fluorine.

The epoxidation of a 1,2-dichloro-ω-ethylenically unsaturated fluorocarbon is effected by means of an inorganic peroxide in an alkaline medium at +50 to +50° C. The reaction medium may be water or a mixture of water and a water-miscible organic compound, for example, the aliphatic alcohols, ketones, aldehydes or esters. Particularly preferred are acetone, methanol, ethanol, and the like, admixed with minor amounts of water. Although the reaction temperature generally is maintained between −50° C. and +50° C., the preferred range is −45 to 0° C. A wide variety of bases are operable herein to provide an alkaline solution, i.e., a reaction medium having an aqueous pH measurement of greater than 7. Similarly, a wide variety of inorganic oxidants may be employed. Although hydrogen peroxide is the preferred oxidizing agent, other oxidants, such as sodium hypochlorite, can be utilized. Further details of this epoxidation reaction may be found in co-assigned application S.N. 114,597, filed June 5, 1961.

The dehalogenation of the epoxide is achieved by contacting it with at least a stoichiometric amount of zinc in an oxygen-containing organic liquid such as is commonly employed in dehalogenation reactions. The preferred reaction media are the acyclic and cyclic ethers, such as diethyl ether, di-n-butyl ether, 1,2-dimethoxyethane, β,β′-dimethoxydiethyl ether, tetrahydrofuran and dioxane, with the latter being especially preferred. The dehalogenation preferably is carried out at elevated temperatures to achieve a satisfactory rate of reaction, for example, from about 50° C. to about 125° C.

An alternate route for the preparation of 1,2-dichloro-ω-ethylenically unsaturated perfluorocarbons involves a telomerization reaction between 1,2-dichloro-1-iodoperfluoroethane and tetrafluoroethylene. The adduct from this reaction is comprised of one or more moles of reacted tetrafluoroethylene per mole of reacted halogenated ethane depending upon the ratio of the reactants employed. The adduct then is subjected to a telomerization reaction with trifluoroethylene to yield a hydroiodo derivative which is dehydrohalogenated, by removing hydriodic acid, to yield the desired 1,2-dichloro-ω-ethylenically unsaturated fluorocarbon. The telomerization reaction between tetrafluoroethylene and 1,2-dichloro-1-iodoperfluoroethane is carried out in sealed tubes either at autogenous pressure or under constant pressure of tetrafluoroethylene at elevated temperatures. Preferably the temperature is in the range 110° to 125° C. Reaction time may be varied considerably although the reaction generally is continued for 10 to 20 hours. The telomerization reaction product is comprised of a mixture of adducts containing one or more moles of reacted tetrafluoroethylene per mole of reacted iodoethane, with the relative amounts of each depending particularly upon the initial mole ratio of tetrafluoroethylene to the iodoethane, and further, upon whether the reaction was conducted under autogenous pressure or under a constant pressure of tetrafluoroethylene. By this process, products containing 1 to 5 moles of tetrafluoroethylene per mole of iodoethane can be obtained. In order to introduce the higher amounts of tetrafluoroethylene it is preferable to conduct the reaction repeatedly, recycling the adduct produced in each step with additional tetrafluoroethylene. When the desired adduct has been obtained, it is reacted with trifluoroethylene in another telomerization reaction, to produce a 1,2-dichloro-ω-(α-hydro-β-iodo)ethyl perhalofluorocarbon. Preferably this telomerization reaction is carried out at a temperature of 200 to 225° C., with the amount of the hydroiodo compound being in slight excess of the stoichiometric quantity required by the trifluoroethylene. The time of the reaction may be varied over a broad range, but generally the reaction is carried out for about 8 to 10 hours. In all of the telomerization reactions described above, separation of the products may be achieved by conventional distillation techniques.

It is apparent that the above two-step telomerization route may be used to prepare epoxides of the aforesaid formula wherein X is fluorine and $n$ is an even number from 2 to 10. When it is desired to prepare the first member of the series, i.e., where $n$ is 0, the initial reaction with tetrafluoroethylene is omitted. In this case the chlorofluoroiodoethane is reacted immediately with trifluoroethylene to form the hydroiodobutane which then is dehydroiodinated to 3,4-dichloroperfluoro-1-butene. Further, when it is desired to produce those epoxides wherein $n$ is an odd number, perfluoroallyl iodide is employed as an initial reactant in place of the dichloroiodoethane. After the requisite chain length has been achieved by this telomerization route, chlorination of the residual double bond may be effected by conventional means, such as described in the publication by Lovelace et al. (see Example I), to produce a dichloroiodo compound, which then is dehydrohalogenated to the desired 1,2-dichloro-ω-ethylenically unsaturated perfluorocarbon.

The dehydrohalogenation of the hydroiodo compound is effected by treating said compound with a base. A suitable process involves the use of an inorganic base, and preferably, an alkali metal hydroxide such as sodium hydroxide or potassium hydroxide. The reaction generally is carried out in equipment so adapted that either refluxing or distillation may be carried out. For example, a round bottom flask to which is attached a spinning band fractionating column equipped with a distillation head may be employed. In one such embodiment of the dehydrohalogenation reaction an aqueous solution of potassium hydroxide is heated to reflux temperature and the hydroiodo compound is introduced through a side arm. A decrease in the temperature at the distillation head indicates the formation and refluxing of the desired olefin. At this point a mixture of olefin and water is removed. After drying and redistillation, pure dichloro olefin is recovered. This chloroolefin then is epoxidized and dehalogenated, as described hereinabove, to yield the desired epoxyolefin.

As shown by the general formula, supra, the ethylenically unsaturated fluorinated epoxides of the instant invention may contain 4 to 14 carbon atoms in the normal chain depending upon the value of $n$. When $n$ is zero, the epoxide contains only 4 carbon atoms and the material is, of course, a perfluorinated compound. When $n$ is 1 to 10, it may be seen that the carbon atoms of the group $CX_2$ may be substituted either with fluorine or chlorine atoms. In order to maintain the excellent chemical and thermal stabilities commonly associated with the perfluorinated compounds, at least 75% of said halogen atoms of the $CX_2$ connecting group should be fluorine atoms, and preferably, the group should be perfluorinated. Illustrative of the monomeric compounds of this invention are 3,4-epoxyperfluoro-1-butene, 4,5-epoxyperfluoro-1-pentene, 5,6-epoxyperfluoro-1-hexene, 6,7-epoxyperfluoro-1-heptene, 4 - chloro - 6,7 - epoxyperfluoro - 1-heptene, 7,8-epoxyperfluoro-1-octene, 4,6-dichloro - 8,9-epoxyperfluoro-1-nonene, 9,10-epoxyperfluoro - 1 - decene, 4,6,8-trichloro-10,11-epoxyperfluoro - 1 - undecene, 11,12-epoxyperfluoro-1-dodecene, 12-13-epoxyperfluoro-1-tridecene, 4,6,8,10-tetrachloro-12,13 - epoxyperfluoro - 1 - tridecene and 13,14-epoxyperfluoro-1-tetradecene.

The following examples illustrate but do not limit the syntheses which can be used to prepare a variety of the unsaturated fluorocarbon epoxides of this invention.

EXAMPLE I

*Preparation of 1,2-epoxy-4,5-dichloroperfluoropentane*

4,5-dichloroperfluoro-1-pentene was prepared by pyrolysis of the sodium salt of 3,5,6-trichloroperfluorahexanoic acid by the general method described in "Aliphatic Fluorine Compounds," Lovelace, Rausch, and Postelnek, Reinhold Publishing Corp., 1958, Method 306, page 107.

A 3-l., 4-necked, creased flask was fitted with a stirrer, a dropping funnel, a condenser, and a low-temperature thermometer. In the flask were placed 63 g. (1.125 moles) of potassium hydroxide, 113 ml. of water, and 810 ml. of reagent grade methanol. The mixture was cooled to −20° C., and 406 g. (3.60 moles) of 30% hydrogen peroxide was added. The mixture was cooled to −35° C. and 255 g. (0.90 mole) of 4,5-dichloroperfluoro-1-pentene was added during 15 minutes. The temperature at the end of the addition was −30° C. and this temperature was maintained for about one hour. The reaction mixture was then warmed to −20° C. for one hour, then warmed to and kept at −10° C. for one hour. The entire reaction mixture was poured into 1.6 l. of ice and water in a large separatory funnel and the lower layer was removed. This product was dried with magnesium sulfate and amounted to 201 g. of material of about 90% purity as determined by gas chromatographic analysis on a silicone "DC 200" oil-on-firebrick column. A pure sample of 1,2-epoxy-4,5-dichloroperfluoropentane, B.P. 90° C., $n_D^{25}$ 1.3250, was separated from unreacted starting material by gas chromatography on the silicone oil column. ("DC 200" is a trademark identifying a silicone oil commercially available from Dow-Corning Corp.)

*Analysis.*—Calc'd for $C_5Cl_2F_8O$: F, 50.84; Cl, 23.72. Found: F, 50.89; Cl, 23.64.

EXAMPLE II

*Preparation of 4,5-epoxyperfluoro-1-pentene*

A 500-ml., 4-necked flask fitted with a stirrer, condenser, thermometer, and pressure-equalized dropping funnel with a nitrogen inlet at the top was dried in an oven overnight, assembled while hot, and cooled in a stream of nitrogen. The outlet of the condenser was connected to a trap cooled in "Dry-Ice" and protected by a drying tube. The flask was charged with 73.6 g. of oven-dried zinc (activated by washing with 4% HCl) and 200 ml. of sodium-dried dioxane. The mixture was stirred and heated to reflux with hot water (about 55° C.) in the condenser. From the dropping funnel there was added 86.2 g. (0.288 mole) of 1,2-epoxy-4,5-dichloroperfluoropentane during 88 minutes. A slow stream of nitrogen swept the product into the "Dry-Ice"-cooled trap, and after 2½ hours, about 30 ml. of product had been collected. Distillation of this material through a small spinning band column afforded 27.4 g. (0.116 mole or 40%) of 4,5-epoxyperfluoro-1-pentene, B.P. 37° C.

This product was contaminated with perfluoro-1,4-pentadiene resulting from dechlorination of 4,5-dichloroperfluoro-1-pentene present in the starting epoxide. Distillation cuts were 90–96% pure. A sample was purified for analysis by gas chromatography on a 21' x ⅜" column of silicone "DC 200" oil-on-firebrick.

*Analysis.*—Calc'd for $C_5F_8O$: C, 26.33; F, 66.66. Found: C, 26.86; F, 66.36.

Infrared bands at 6.45μ (fluorinated epoxide) and 5.65μ (terminal fluoroolefin) confirmed the structure.

EXAMPLE III

*Preparation of 1,2-epoxy-5,6-dichloroperfluorohexane*

The 5,6-dichloroperfluoro-1-hexene used in this example was prepared by a telomerization route similar to that described by A. T. Lilyquist, Ph.D. thesis, University of Florida, 1960.

A 1-l., creased flask equipped with a high-speed stirrer, dropping funnel, condenser, and low-temperature thermometer was charged with 8.6 g. of potassium hydroxide, 16 ml. of water, and 109 ml. of methanol. The solution was cooled to −30° C., and 55.2 g. of 30% aqueous hydrogen peroxide was added slowly. The mixture was stirred rapidly and 40.6 g. of 5,6-dichloroperfluoro-1-hexene was added during one-half hour. The stirred suspension was maintained at −30° C. for ½ hr., −20° C. for 1 hour., and −10° C. for 1½ hrs. The reaction mixture was then poured into 230 ml. of ice and water in a separatory funnel. The lower layer was separated and dried over magnesium sulfate. Distillation of the product through a small spinning-band column afforded 25.4 g., about 60% yield, of 1,2-epoxy-5,6-dichloroperfluorohexane contaminated with about 20% of the starting olefin, 5,6-dichloroperfluoro-1-hexene. A pure sample of the material was obtained by preparative-scale gas chromatography, B.P. 110.5 to 111° C., $n_D{}^{25}$ 1.3232.

*Analysis.*—Calc'd for $C_6F_{10}Cl_2O$: F, 54.44; Cl, 20.32. Found: F, 54.39; Cl, 20.47.

Infrared absorption at 6.45μ indicated the presence of the terminal epoxide group, and the absence of absorption at 5.65μ indicated that all of the starting olefin had been removed from this sample.

EXAMPLE IV

*Preparation of 5,6-epoxyperfluoro-1-hexene*

An oven-dried, 300-ml., creased, 4-necked flask fitted with a condenser, pressure-equalized dropping funnel, a "Tru-Bore" stirrer, and a thermometer was dried in an oven overnight, assembled while hot, and cooled in a stream of dry nitrogen. The flask was charged with 100 g. of activated zinc duct and 100 ml. sodium-dried dioxane. The mixture was heated under reflux with hot water, 55° C., in the condenser. The outlet of the condenser was connected to a "Dry-Ice"-cooled trap protected by a drying tube. A stream of dry nitrogen, about 50 ml./min., was passed through the dropping funnel and out through the condenser and trap while 25.4 g. of 1,2-epoxy-5,6-dichloroperfluorohexane was added during 2¾ hrs. The reaction was continued for another 1.5 hr. The products in the "Dry-Ice"-cooled trap, about 10 ml., were distilled and there was obtained a mixture of 5,6-epoxyperfluoro-1-hexene and perfluoro-1,5-hexadiene, B.P. 58–60° C. Gas chromatography was used to separate from this mixture a pure sample of 5,6-epoxyperfluoro-1-hexene, B.P. 59° C., $n_D{}^{25}$ <1.30.

*Analysis.*—Calc'd for $C_6F_{10}O$: F, 68.33. Found: F, 68.18.

EXAMPLE V

*Preparation of 1,2-epoxy-4,6,7-trichloroperfluoroheptane*

The 4,6,7-trichloroperfluoro-1-heptene used in this example was prepared by the procedure of Example I by pyrolysis of the sodium salt of 3,5,7,8-tetrachloroperfluorooctanoic acid. The pure trichloroheptene has a B.P. of 65–67° C. at 21 mm., $n_D{}^{25}$ 1.3626–1.3628.

*Analysis.*—Calc'd for $C_7Cl_3F_{11}$: Cl, 26.63; F, 52.35. Found: Cl, 26.75; F, 52.53.

1A-1., creased flask fitted with a high-speed stirrer, a low-temperature thermometer, a dropping funnel, and a condenser was charged with 25 g. of potassium hydroxide, 45 ml. of water and 325 ml. of methanol. The mixture was cooled to −30° C. with stirring, and 162 g. of 30% aqueous hydrogen peroxide was added slowly. The mixture was kept at −30° C. while 143 g. of 4,6,7-trichloroperfluoro-1-heptene was added during 15 minutes. The mixture was kept at −30° C. for 1 hr., −20° C. for 1.5 hrs., and −10° C. for 1.3 hrs. with continuous, vigorous stirring. The reaction mixture was poured into 600 ml. of ice and water, and the lower layer was removed. It was dried over magnesium sulfate and there was obtained after distillation through a small spinning-band column 96 g. of 1,2-epoxy-4,6,7-trichloroperfluoroheptane, B.P. 63–65° C. at 22 mm., $n_D{}^{25}$ 1.3538–1.3541.

The epoxide was contaminated with about 20% of the starting olefin. A pure sample, $n_D{}^{25}$ 1.3506, was obtained for analysis by gas chromatography.

*Analysis.*—Calc'd for $C_7F_{11}Cl_3O$: Cl, 25.60; F, 50.30. Found: Cl, 25.63; F, 50.43.

EXAMPLE VI

*Preparation of 6,7-epoxy-4-chloroperfluoro-1-heptene*

A 500-ml., 4-necked, creased flask fitted with a "Tru-Bore" stirrer, a condenser, dropping funnel, and thermometer was dried in an oven, assembled while hot, and cooled in a stream of nitrogen. The flask was charged with 100 g. of activated zinc dust and 100 ml. of anhydrous diethylene glycol dimethyl ether. The reaction mixture was stirred vigorously and heated to 100° C. in an oil bath. Steam was passed through the condenser and the outlet was connected to a "Dry-Ice"-cooled trap protected by a drying tube. About 50 ml./min. of nitrogen was passed through the pressure-equalized dropping funnel into the reaction flask and out through the condenser into the trap. Then 41.6 g. of slightly impure 1,2-epoxy-4,6,7-trichloroperfluoroheptane was added during one hour. After 2½ hrs., about 7.5 ml. of product had collected in the "Dry-Ice" trap. Distillation of this material afforded 5.2 g. of 6,7-epoxy-4-chloroperfluoro-1-heptene, B.P. 100–102° C., $n_D{}^{25}$ 1.3238, which was contaminated with 4-chloroperfluoro-1,6-heptadiene. A pure sample of 6,7-epoxy-4-chloroperfluoro-1-heptene, $n_D{}^{25}$ 1.3195, was obtained by preparative-scale gas chromatography.

*Analysis.*—Calc'd for $C_7F_{11}ClO$: Cl, 1029; F, 60.67. Found: Cl, 10.25; F, 60.70.

As suggested hereinabove, the ethylenically unsaturated fluorinated epoxides of this invention are useful for the formation of both homopolymers and copolymers. The polymers may be formed either by a free radical-induced polymerization of the trifluorovinyl group or by an anionic-initiated polymerization of the epoxy or trifluorooxirane ring. The monomers of the instant invention are suitable for copolymerization with monomers of either the ethylenic unsaturation of oxirane type. Although the monomers copolymerizable with the compounds of the instant invention can be of the highly fluorinated type, this need not necessarily be the case. Thus, although the ethylenically unsaturated epoxides may be copolymerized with a wide variety of ethylenically unsaturated fluorinated monomeric materials such as hexafluoropropylene, vinylidene fluoride, vinyl fluoride, tetrafluoroethylene, and the like, as well as with fluorinated materials of the oxirane type such as hexafluoropropylene oxide, a wide variety of non-fluorinated monomers also may be copolymerized therewith. The latter monomers include the α-olefins, i.e. terminal olefins, e.g. the hydrocarbon monomers ethylene, propylene and the like, the vinyl esters, the acrylic and methacrylic esters, vinyl chloride, vinylidene chloride, as well as the epoxy type monomers. Copolymers may be prepared so as to contain 0.5 to 95 weight percent of the monomers of the instant invention. The preferred copolymers are those which contain 0.5 to 50 weight percent of the polymerized ethylenically unsaturated fluorinated epoxide. Especially preferred are copolymers containing 0.5 to 10 weight percent of the polymerized monomers of this invention since such copolymers subsequently can be cross-linked to the extent necessary for achieving the desired alteration in the physical properties of the polymer type represented by the major fraction of polymeric repeat units. It has been noted that some copolymers containing larger quantities of the polymerized monomers of this invention, upon post-reaction to achieve cross-linking, become excessively brittle because of the high cross-link densities produced.

It is to be understood that the above-described copolymers are not limited to polymers prepared from only two comonomers, but include those which are preparable from either a plurality of the ethylenically unsaturated epoxides of the instant invention of a plurality of vinyl, α-olefin or oxirane comonomers with one or more of the fluorinated epoxides disclosed herein.

The monomers of the instant invention are particularly useful when included in copolymers so as to provide reactive sites for subsequent post-polymerization cross-linking reactions. With certain combinations of comonomers, for example, with hexafluoropropylene oxide, polymerization initially may be carried to a viscous oil stage, followed by subsequent curing to a solid elastomeric material. The ready conversion of such polymers from a liquid to a solid enhances their utility for "in-place" fabrication techniques. The monomers disclosed herein also are useful for the formation of homopolymers which may be fabricated into optically clear fibers, films, molded objects and the like. Moreover, these monomers are useful as chemical intermediates or for changing surface properties of papers and fabrics to render them resistant to wetting and staining.

The structures of the polymers available through use of the novel monomers disclosed herein are predictable from a consideration of prior art polymerization theories. Hence, polymerization across the double bond of the ethylenically unsaturated fluorinated epoxide proceeds by a conventional addition polymerization mechanism. Similarly, anionic polymerization across the oxirane moiety occurs through a ring opening process whereby a carbonyl fluoride end group is produced. Since such an end group is a highly reactive entity, polymers containing this group may be further post-reacted with a wide variety of materials. As one example may be cited the reaction thereof with alcohols to produce an alkoxycarbonyl end group in the polymer.

Following are examples demonstrating the usefulness of the aforesaid ethylenically unsaturated epoxides in the formation of polymers.

EXAMPLE VII

*Homopolymerization of 4,5-epoxyperfluoro-1-pentene by ultraviolet irradiation*

A sample of 4,5-epoxyperfluoro-1-pentene purified by gas chromatography on a ⅜" x 21' column of silicone "DC 200" oil-on-firebrick was sealed in a quartz ampoule at $-196°$ C. in vacuo. It was irradiated for 25 days at room temperature with a low-pressure, mercury resonance lamp. The tube was opened and volatiles were removed by evacuating the sample to 0.3 mm. for ½ hr. at room temperature. The viscous, oily residue was a homopolymer of the starting material.

*Analysis.*—Calc'd for $C_5F_8O$: C, 26.33; F, 66.66. Found: C, 27.16; F, 66.64.

Infrared examination of this material showed that although it contained some unsaturation and had absorption due to epoxide, the bands denoting these groups were shifted from 5.65 to $5.8\mu$ and 6.45 to $6.5\mu$, respectively. Repetition of this experiment with a 10-day irradiation period provided a similar polymer which was soluble in 1,1,2-trichloro-1,2,2-trifluoroethane ("Freeon–113").

EXAMPLE VIII

*Homopolymerization of 4,5-epoxyperfluoro-1-pentene*

In a platinum ampoule, 0.146" in diameter x %16" long, there was sealed 0.0694 g. of 4,5-epoxyperfluoro-1-pentene. The ampoule was packed in the reaction space of a 1-inch tetrahedral anvil apparatus and subjected to 65,000 atm. pressure at $200°$ C. for four hours. When it was removed from the apparatus, the platinum ampoule contained 0.0673 g. of a clear, plastic polymer recovered from the ampoule as a solid molding. Differential thermal analysis of the sample showed it to have a melting point of $120°$ C. At $235°$ C. an exothermic reaction occurred which is believed indicative of thermal curing. When the cured sample was cooled a clear, glassy material was obtained.

EXAMPLE IX

*Terpolymerization of 4,5-epoxyperfluoro-1-pentene with vinylidene fluoride and hexafluoropropylene*

Under a nitrogen blanket, 190 ml. of distilled deoxygenated water, 10 ml. of 1% silver nitrate solution, 1.1 g. of ammonium persulfate, 0.15 g. of ammonium perfluorooctanoate, 3.0 g. of $Na_2HPO_4 \cdot 7H_2O$ and 1.2 ml. of 4,5-epoxyperfluoro-1-pentene were added to a shaker tube. The tube was cooled in a "Dry-Ice"/acetone bath, and 35 g. of hexafluoropropylene and 25 g. of vinylidene fluoride were added. The tube, after sealing, was heated to $50°$ C. with shaking and held there for 7 hours. The emulsion obtained was frozen to coagulate the product, which was then washed three times with 600 ml. of distilled water and dried in a vacuum oven at $80°$ C. There was obtained 31 g. or 51% of a solid elastomeric terpolymer of hexafluoropropylene, vinylidene fluoride, and 4,5-epoxyperfluoro-1-pentene. Incorporation of 4,5-epoxyperfluoro-1-pentene in the polymer by vinyl-type polymerization was shown by its infrared spectrum, which has a band at $6.55\mu$ characteristic of the trifluorooxirane ring and which does not have the $5.6\mu$ band characteristic of the trifluorovinyl monomer end group. There is no $6.55\mu$ band in the infrared spectra of known copolymers containing only vinylidene fluoride and hexafluoropropylene.

EXAMPLE X

*Copolymerization of 4,5-epoxyperfluoro-1-pentene with hexafluoropropylene oxide*

A glass tube was charged with 0.195 g. of cesium fluoride which had been dried by fusion in a platinum dish. The material was transferred in a dry box under argon to a polymer tube. Tetraethylene glycol dimethyl ether, 0.28 ml., was added and then 6.4 g. of 4,5-epoxyperfluoro-1-pentene and 50 g. of hexafluoropropylene oxide were distilled into the tube at $-40°$ C. The tube was warmed to $-27°$ C. for 10 min. to mix the contents well, then cooled to $-40$ to $-45°$ C. and held there overnight. The tube was then warmed to $-30$ to $-35°$ C. for 2 hrs., maintained at $-35$ to $-40°$ C. for several hours, and again maintained at $-40°$ C. to $-45°$ C. overnight. The tube was opened and pump-evacuated at $40°$ C. to remove volatile materials. The infrared spectrum of the crude residual product showed absorption at $5.29\mu$ characteristic of the carbonyl fluoride end groups of perfluoroepoxy polymer chains and a band at $5.6\mu$ attributed to the trifluorovinyl group of the comonomer. Distillation of this material at $135-255°$ C. at 0.05–4.5 mm. provided 36.2 g. of a viscous liquid copolymer. Infrared showed that the trifluorovinyl group had rearranged during the distillation to $CF_3CF=CF-$.

EXAMPLE XI

*Copolymerization of hexafluoropropylene oxide with 4,5-epoxyperfluoro-1-pentene*

A polymerization vessel with a cooling jacket whose temperature was controlled with a thermostated circulating bath was charged with 3.80 g. of fusion-dried cesium fluoride and 5 ml. of tetraethylene glycol dimethyl ether in an argon atmosphere. The inert atmosphere was displaced with 40 g. of hexafluoropropylene oxide and the mixture was stirred vigorously for 15 min. to form in situ the active catalyst. The flask was again swept with argon and cooled and 130 g. of 4,5-epoxyperfluoro-1-pentene and 990 g. of hexafluoropropylene oxide were distilled into the flask. The mixture was held at $-40°$ C. for 4 hrs. and then at $-45°$ C. for 17 hrs. It was warmed to $-40°$ C. for 3 hrs. and then stirred at $-45°$ C. for 69 hrs. by which time it had become too viscous to stir. The mixture was warmed to room temperature and pumped under full vacuum to remove volatiles. There was obtained 1,007 g. of viscous liquid copolymer, 93.4% of the theoretical amount. The copolymer showed infrared absorption at $5.6\mu$, characteristic of trifluorovinyl end groups, and at $5.29\mu$, characteristic of acid fluoride end groups.

EXAMPLE XII

Preparation of a copolymer with methoxycarbonyl end groups

In a clear plastic bottle were placed 974 g. of the hexafluoropropyleneoxide/4,5 - epoxyperfluoro-1-pentene copolymer with acid fluoride ends described in Example XI and 1400 ml. of reagent grade methanol. The mixture was stirred vigorously for 1.5 hrs. and the heavy fluorocarbon layer was separated. Neutral alumina, 80 g., was added and the product was filtered through a sintered glass funnel. The product was pumped at 0.25 mm. vacuum to remove volatiles and there was obtained 783 g. of liquid copolymer ester. Infrared examination of the polymer showed that the acid fluoride ends had been converted to methoxycarbonyl ends since there was no absorption at 5.29μ. Duplicate cryoscopic molecular weight determinations were 3800 and 4200, respectively.

EXAMPLE XIII

Curing of the copolymer of hexafluoropropylene oxide and 4,5-epoxyperfluoro-1-pentene In a quartz ampoule was sealed, under vacuum, about 1 ml. of the copolymer prepared in Example XI. The quartz tube was placed in side the coil of a low-pressure mercury resonance arc and irradiated for 65 hrs. The oil was transformed to a very viscous material which would barely flow at room temperature. NMR examination of the product indicated that both the vinyl and the carbonyl fluoride end groups had participated in the curing reaction.

EXAMPLE XIV

Curing of the hexafluoropropylene oxide/4,5-epoxyperfluoro-1-pentene copolymer having methoxycarbonyl ends A quartz ampoule was charged with about 1 ml. of the copolymer prepared in Example XIII, pumped to low pressure, and sealed in vacuum. The ampoule was placed in a coil of a low-pressure, mercury resonance arc and irradiated 64.5 hours. The tube contained a solid, rubbery material which was removed and washed with "Freon-113" to dissolve material which was not cross-linked. The product was a cured, elastomeric material with a glass transition temperature of −38° C.

EXAMPLE XV

Copolymerization of 4,5-epoxyperfluoro-1-pentene with tetrafluoroethylene

A heavy-walled glass tube was loaded with 5 ml. of dichlorodifluoromethane, 2.34 g. of uninhibited tetrafluoroethylene and 6.30 g. of 4,5-epoxyperfluoro-1-pentene. The mixture was sealed under vacuum and irradiated at −80° C. for 1 hour with 3 mev. 500 microamp. X-rays from a Van de Graaff accelerator. At the end of this treatment, the tube was opened, allowed to warm to room temperature and evacuated to remove volatile liquids. The polymeric residue was found to contain about 5 mole percent of copolymerized epoxyperfluoropentene as judged by infrared absorption at 6.4μ. This analysis was confirmed by differential thermal analysis which gave the polymer melt temperature near 300° C.

EXAMPLE XVI

Copolymerization of 4,5-epoxyperfluoro-1-pentene with vinyl chloride

A heavy-walled glass polymer tube was charged with 0.015 g. of benzoyl peroxide and 3.0 ml. of 4,5-epoxyperfluoro-1-pentene. The tube and contents were cooled to −80° C. Vinyl chloride (2 liters of gas at 1 atmosphere) was introduced by vacuum transfer and the tube was sealed. The reaction mixture which became homogeneous on warming to room temperature was heated in a hot water bath at 55° C. for about 40 hours. The tube was again cooled and then opened and the volatile products were distilled in vacuum. The residue, 1.44 g. of white polymer, was pumped at 0.3 mm. at room temperature for 3 hours. Fluorine analysis of 4.36% demonstrated that the copolymer contained a ratio of about one part of 4,5-epoxyperfluoro-1-pentene to 50 parts of vinyl chloride.

The embodiments of the invention in which an exclusive property or privilege is claimed are defined as follows:

1. The class of compounds having the formula

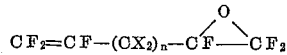

wherein X is selected from the group consisting of fluorine and chlorine and n is zero to 10, with the provisos that at least 75% of the X atoms are fluorine, and when X is chlorine the carbon atom to which it is attached is at least 1 carbon atom removed from the trifluorovinyl and trifluorooxirane groups and any other carbon atom containing chlorine.

2. 4,5-epoxyperfluoro-1-pentene.
3. 5,6-epoxyperfluoro-1-hexene.
4. 6,7-epoxy-4-chloroperfluoro-1-heptene.
5. A curable ethylenic addition homopolymer of the class of compounds of claim 1, said homopolymer having pendant trifluorooxirane groups.
6. A curable oxirane addition homopolymer of the class of compounds of claim 1, said homopolymer having pendant trifluorovinyl groups.
7. A curable ethylenic addition copolymer comprised of 0.5 to 95 weight percent of the polymerized class of compounds of claim 1 and 99.5 to 5 weight percent of a polymerized monomer selected from the group consisting of α-olefins and vinyl and vinylidene monomers, said copolymer having pendant trifluorooxirane groups.
8. The copolymer of claim 7 comprised of 0.5 to 50 weight percent of the polymerized class of compounds of claim 1 and 99.5 to 50 weight percent of said polymerized monomer.
9. The copolymer of claim 7 comprised of 0.5 to 10 weight percent of the polymerized class of compounds of claim 1 and 99.5 to 90 weight percent of said polymerized monomer.
10. The copolymer of claim 7 wherein said polymerized monomer is a polymerized perfluorinated α-olefin.
11. The copolymer of claim 10 wherein the perfluorinated α-olefin is tetrafluoroethylene.
12. The copolymer of claim 7 wherein said polymerized monomer is a polymerized mixture of vinylidene fluoride and hexafluoropropylene.
13. The copolymer of claim 7 wherein said polymerized monomer is polymerized vinyl chloride.
14. A curable oxirane addition copolymer comprised of 0.5 to 95 weight percent of the polymerized class of compounds of claim 1 and 99.5 to 5 weight percent of a polymerized oxirane, said copolymer having pendant trifluorovinyl groups.
15. The copolymer of claim 14 comprised of 0.5 to 50 weight percent of the polymerized class of compounds of claim 1 and 99.5 to 50 weight percent of the polymerized oxirane.
16. The copolymer of claim 14 comprised of 0.5 to 10 weight percent of the polymerized class of compounds of claim 1 and 99.5 to 90 weight percent of the polymerized oxirane.
17. The copolymer of claim 14 wherein the oxirane is hexafluoropropylene oxide.

References Cited
UNITED STATES PATENTS 3,261,874   7/1966   Stogryn et al. _____ 260—615

JOSEPH L. SCHOFER, Primary Examiner.

S. M. LEVIN, Assistant Examiner.